(No Model.)

J. A. COULTAUS.
SPRING ARMORED HOSE PIPE.

No. 325,591. Patented Sept. 1, 1885.

WITNESSES:
Theo. G. Hoster
C. Sedgwick

INVENTOR:
J. A. Coultaus
BY Munn & Co.
ATTORNEYS.

UNITED STATES PATENT OFFICE.

JOSEPH ALLEN COULTAUS, OF BROOKLYN, NEW YORK, ASSIGNOR TO HIM-SELF AND DANIEL M. ROLLINS, OF SAME PLACE, AND PHILEMON R. DAY, OF NEW YORK, N. Y.

SPRING-ARMORED HOSE-PIPE.

SPECIFICATION forming part of Letters Patent No. 325,591, dated September 1, 1885.

Application filed June 19, 1884. (No model.)

*To all whom it may concern:*

Be it known that I, JOSEPH A. COULTAUS, of Brooklyn, in the county of Kings and State of New York, have invented a new and useful Improvement in Armored Pipes and in the manufacture thereof, of which the following is a full, clear, and exact description.

Hose and other flexible pipe have heretofore been armored by wire coiled around the pipe for the purpose of giving additional strength and to prevent abrasion of the hose; but such armor, being loose on the pipe between its ends, requires refastening when the hose is cut, and, being non-elastic, prevents expansion under heavy pressure or fails to retain its shape.

The object of my invention is to obviate these difficulties named; and to that end it consists in spiral armor formed of spring-steel wire, the internal diameter of the spiral being smaller than the external diameter of the pipe, so that the coils form a spiral spring that binds closely at every portion of its length.

The invention further consists in a method of winding or coiling wire upon hose or other pipe, whereby the spiral is given its character as a sphincter-spring, as hereinafter described and claimed.

Reference is to be had to the accompanying drawings, forming part of this specification, in which similar letters of reference indicate corresponding parts in all the figures.

Figure 1:
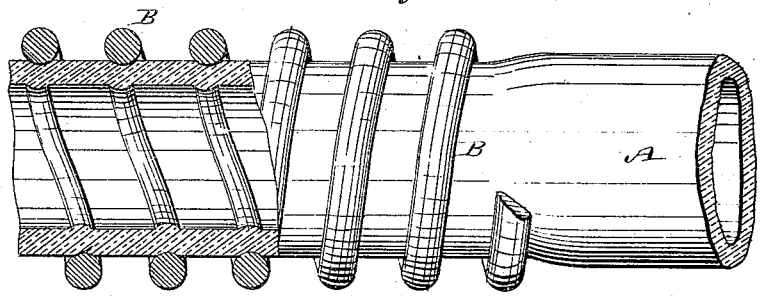
Figure 2:
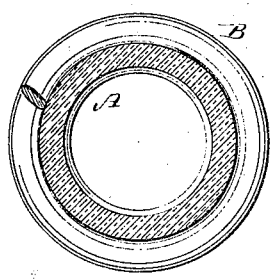
Figure 3:
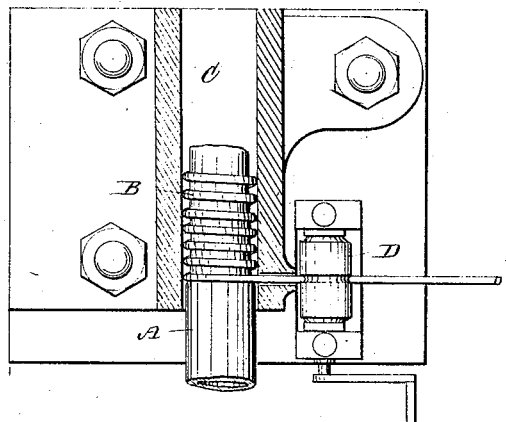

Figure 1 is a side elevation, partially in section, of a pipe with the improved armor.
Fig. 2 is a cross-section of the same. Fig. 3 is a sectional plan view, and Fig. 4 a cross-section, of the machine employed for armoring the pipe.

A represents a hose or other pipe made of rubber, leather, or other material.

B is the spiral armor wound on the pipe. The armor is formed of spring-steel wire or wire of other spring metal, so that the spiral is not only elastic in the direction of its length, but in every direction, so that it readily gives way when the pipe is bent or flattened, and also allows any slight expansion without the wire becoming set. The internal diameter of the spiral is slightly smaller than the external diameter of the pipe, so that the wire takes firm hold on the pipe, slightly indenting it if the pipe is made of rubber or leather. The armor thus applied forms a sphincter-spring, or one having contractile force, that grips the pipe and causes a constant inward pressure thereon by every portion of the coil, which prevents the armor from becoming misplaced or slipped when the hose is dragged, and saves the necessity of any other fastening or covering. The pipe is also by this binding action re-enforced by the full strength of the coil, whether the internal pressure be light or heavy.

Hose and other pipe armored in this manner can be cut at any point without displacing the coils, and the ends of the wire do not require fastening.

Figure 4:
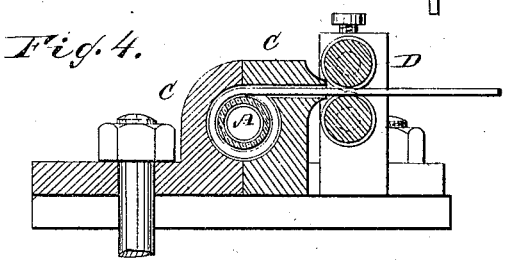

In armoring the hose or other pipe the machine patented to me September 26, 1882, numbered 265,026, is employed. This machine, as shown in Figs. 3 and 4, consists, essentially, of grooved blocks C, that receive the pipe A, and of the feed-rollers D D, by which the wire is forced inward and coiled on the pipe. This formation of a coiled spring is by a new method—that is, by pressure applied in the direction of the feed—the effect of which is that the coils are given the sphincter or contractile feature. In the case of hose-pipe there will be a reduction in the diameter of the pipe by the winding, and the contractile force of the coils will be sufficient to maintain the reduction and a constant sphincter-pressure in every part of the coils.

I am aware that hose-pipe has been covered or protected by a winding of wire or other material; but when the process of manufacturing such article is taken into consideration it will be seen that my invention is not present in such constructions. In those cases the coils must be loose, or else the hose must be wound with a soft or annealed wire, because it would be impossible to first form the spiral of a size to fit closely upon the pipe and then place it upon the pipe.

The apparatus by which I produce my armored hose-pipe, as shown, involves a process for making a continuous spiral sphincter-spring, which is entirely different from ordinary methods for making spiral springs which are simply wound upon mandrels, and when released from the mandrel will immediately expand. By my process the spring-wire is wound upon the hose by an endwise pressure given to the wire in the direction of feed, thereby extending each successive coil as made, so as to give to the spring the feature of the contractile or sphincter pressure. I am not aware that a spiral sphincter-spring can be made in any other manner, or applied to a hose-pipe by any other means. Such armor, if made of spring-wire, could not possibly be applied so as to hug the surface of the pipe, because if wound on the hose in the usual manner of winding springs the coils would immediately expand upon their release, while if made of soft or annealed wire the armor has not the functions of mine.

Although I have herein shown and described a mechanism for the production of my improved spring-armor, I do not herein make claim to any part of said mechanism, as the same is intended by me to form the subject of a future application for a patent.

Having thus described my invention, what I claim as new, and desire to secure by Letters Patent, is—

1. As an improved article of manufacture, a flexible pipe made with a sphincter-spring armor, substantially as shown and described.

2. The combination, with a flexible pipe, of a sphincter-spring armor, substantially as shown and described.

3. The combination, with a flexible pipe, of a spiral-spring armor of smaller interior diameter than the exterior of the pipe, substantially as described, whereby said spring will press into and strengthen said pipe and render the use of fastening attachments for said armor unnecessary, substantially as described.

JOSEPH ALLEN COULTAUS.

Witnesses:
EDGAR TATE,
ALFRED H. DAVIS.